United States Patent
Feather et al.

(10) Patent No.: US 12,450,760 B2
(45) Date of Patent: Oct. 21, 2025

(54) USING MODEL DATA TO GENERATE AN ENHANCED DEPTH MAP IN A COMPUTER-ASSISTED SURGICAL SYSTEM

(71) Applicant: Intuitive Surgical Operations, Inc., Sunnyvale, CA (US)

(72) Inventors: Heath Feather, Cupertino, CA (US); Rohitkumar Godhani, Milpitas, CA (US); Brian D. Hoffman, Mountain View, CA (US); Brandon D. Itkowitz, San Jose, CA (US); Adam T. Schmidt, Vancouver (CA); Siddarth Sen, San Jose, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 786 days.

(21) Appl. No.: 17/600,061

(22) PCT Filed: Mar. 31, 2020

(86) PCT No.: PCT/US2020/025901
§ 371 (c)(1),
(2) Date: Sep. 29, 2021

(87) PCT Pub. No.: WO2020/205829
PCT Pub. Date: Oct. 8, 2020

(65) Prior Publication Data
US 2022/0175473 A1 Jun. 9, 2022

Related U.S. Application Data

(60) Provisional application No. 62/828,454, filed on Apr. 2, 2019.

(51) Int. Cl.
*G06T 7/50* (2017.01)
*A61B 34/30* (2016.01)
(Continued)

(52) U.S. Cl.
CPC ............... *G06T 7/50* (2017.01); *A61B 34/30* (2016.02); *G06T 7/70* (2017.01); *G06V 10/44* (2022.01);
(Continued)

(58) Field of Classification Search
CPC ......... G06T 15/40; G06T 7/50; G06T 19/006; G06T 7/70; G06T 2207/10028;
(Continued)

(56) References Cited

U.S. PATENT DOCUMENTS 8,147,503 B2 * 4/2012 Zhao ..................... A61B 34/37
382/128
10,706,543 B2 * 7/2020 Donhowe ............... G06T 7/344
(Continued)

OTHER PUBLICATIONS

Lee SC, Fuerst B, Tateno K, Johnson A, Fotouhi J, Osgood G, Tombari F, Navab N. Multi-modal imaging, model-based tracking, and mixed reality visualisation for orthopaedic surgery. Healthcare technology letters. Oct. 2017;4(5):168-73.*
(Continued)

*Primary Examiner* — Phu K Nguyen

(57) ABSTRACT

An exemplary processing system of a computer-assisted surgical system identifies an object in a surgical space, accesses a model of the object, identifies a pose of the object in the surgical space, aligns the model with the pose of the object to define depth data for the model in the surgical space, and generates a depth map in the surgical space for at least a portion of the object based on the depth data for the model. Corresponding systems and methods are also described.

16 Claims, 13 Drawing Sheets

(51) Int. Cl.
  *G06T 7/70* (2017.01)
  *G06V 10/44* (2022.01)
(52) U.S. Cl.
  CPC ............... *G06T 2207/10012* (2013.01); *G06T 2207/10028* (2013.01); *G06T 2207/10068* (2013.01); *G06V 2201/034* (2022.01)
(58) Field of Classification Search
  CPC . G06T 2207/10068; G06T 2207/10012; G06T 2207/30004; G06V 2201/034; G06V 10/44; A61B 34/30
  USPC ......................................................... 345/418
  See application file for complete search history.

(56) References Cited

U.S. PATENT DOCUMENTS

| | | | | |
|---|---|---|---|---|
| 10,917,543 | B2* | 2/2021 | Ramirez Luna | A61B 90/25 |
| 11,202,680 | B2* | 12/2021 | Donhowe | A61B 6/032 |
| 11,442,534 | B1* | 9/2022 | Douglas | G06F 3/0346 |
| 2015/0297313 | A1* | 10/2015 | Reiter | A61B 5/7267 600/408 |
| 2019/0060013 | A1 | 2/2019 | McDowall et al. | |
| 2020/0237452 | A1* | 7/2020 | Wolf | G06F 3/048 |
| 2020/0253683 | A1* | 8/2020 | Amanatullah | A61B 90/06 |
| 2021/0045618 | A1* | 2/2021 | Stricko, III | H04N 13/296 |

OTHER PUBLICATIONS

Bouget D, Allan M, Stoyanov D, Jannin P. Vision-based and marker-less surgical tool detection and tracking: a review of the literature. Medical image analysis. Jan. 1, 2017;35:633-54.*

Su YH, Huang K, Hannaford B. Multicamera 3d reconstruction of dynamic surgical cavities: Non-rigid registration and point classification. In2019 IEEE/RSJ International Conference on Intelligent Robots and Systems (IROS) Nov. 3, 2019 (pp. 7911-7918). IEEE.*

Ye M, Zhang L, Giannarou S, Yang GZ. Real-time 3d tracking of articulated tools for robotic surgery. InMedical Image Computing and Computer-Assisted Intervention-MICCAI 2016: 19th International Conference, Athens, Greece, Oct. 17-21, 2016, Proceedings, Part I 19 2016 (pp. 386-394). Springer International Publis.*

Reiter A, Allen PK, Zhao T. Articulated surgical tool detection using virtually-rendered templates. InComputer assisted radiology and surgery (CARS) Jun. 2012 (pp. 1-8).*

International Search Report and Written Opinion for Application No. PCT/2020/025901, mailed Jun. 5, 2020, 11 pages.

Li Y., et al., "SuPer: A Surgical Perception Framework for Endoscopic Tissue Manipulation with Surgical Robotics," IEEE, Sep. 2019, 8 pages.

Su Yun-Hsuan., et al., "Real-Time Vision-Based Surgical Tool Segmentation with Robot Kinematics Prior," IEEE, 2018, pp. 1-6.

Su Yun-Hsuan., et al., "Comparison of 3D Surgical Tool Segmentation Procedures with Robot Kinematics Prior," IEEE/RSJ International Conference on Intelligent Robots and Systems (IROS), Oct. 2018, pp. 4411-4418.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

Wang R., et al., "Visualization Techniques for Augmented Reality in Endoscopic Surgery," Medical Imaging and Augmented Reality (MIAR2016), XP047357185. Aug. 14, 2016, pp. 129-138.

International Preliminary Report on Patentability for Application No. PCT/2020/025901 mailed on Oct. 14, 2021, 8 pages.

* cited by examiner

USING MODEL DATA TO GENERATE AN ENHANCED DEPTH MAP IN A COMPUTER-ASSISTED SURGICAL SYSTEM

RELATED APPLICATIONS

The present application is a U.S. National Stage Application under 35 U.S.C. § 371 of International Application No. PCT/US2020/025901, filed on Mar. 31, 2020, which claims priority to U.S. Provisional Patent Application No. 62/828,454, filed on Apr. 2, 2019, the contents of which are hereby incorporated by reference in their entirety.

BACKGROUND INFORMATION

A computer-assisted surgical system allows a surgeon to control telemanipulated surgical instruments to perform a surgical procedure on a patient. To this end, the computer-assisted surgical system captures and displays imagery of a surgical space to the surgeon. The computer-assisted surgical system may determine depth information for objects in the surgical space. The depth information may be determined using the captured imagery of the surgical space or using other techniques. However, in some scenarios, determining the depth information may be difficult and/or the depth information may include unknown or unreliable depth data.

SUMMARY

An exemplary system includes a memory storing instructions and a processor communicatively coupled to the memory and configured to execute the instructions to identify an object in a surgical space, access a model of the object, identify a pose of the object in the surgical space, align the model with the pose of the object to define depth data for the model in the surgical space, and generate a depth map in the surgical space for at least a portion of the object based on the depth data for the model.

An exemplary method includes a processor identifying an object in a surgical space, accessing a model of the object, identifying a pose of the object in the surgical space, aligning the model with the pose of the object to define depth data for the model in the surgical space, and generating a depth map in the surgical space for at least a portion of the object based on the depth data for the model.

An exemplary non-transitory computer-readable medium stores instructions that, when executed, direct at least one processor of a computing device to identify an object in a surgical space, access a model of the object, identify a pose of the object in the surgical space, align the model with the pose of the object to define depth data for the model in the surgical space, and generate a depth map in the surgical space for at least a portion of the object based on the depth data for the model.

Another exemplary system includes a memory storing instructions and a processor communicatively coupled to the memory and configured to execute the instructions to identify an object in a surgical space, access model data representative of a model of the object, identify a pose of the object in the surgical space, align the model with the pose of the object, and use the model data to generate, based on the alignment of the model with the pose of the object, an enhanced depth map that includes depth information for points in the surgical space and depth information for points of the model aligned with the pose of the object in the surgical space.

Another exemplary method includes a processor identifying an object in a surgical space, accessing model data representative of a model of the object, identifying a pose of the object in the surgical space, aligning the model with the pose of the object, and using the model data to generate, based on the alignment of the model with the pose of the object, an enhanced depth map that includes depth information for points in the surgical space and depth information for points of the model aligned with the pose of the object in the surgical space.

Another exemplary non-transitory computer-readable medium stores instructions that, when executed, direct at least one processor of a computing device to identify an object in a surgical space, access model data representative of a model of the object, identify a pose of the object in the surgical space, align the model with the pose of the object, and use the model data to generate, based on the alignment of the model with the pose of the object, an enhanced depth map that includes depth information for points in the surgical space and depth information for points of the model aligned with the pose of the object in the surgical space.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
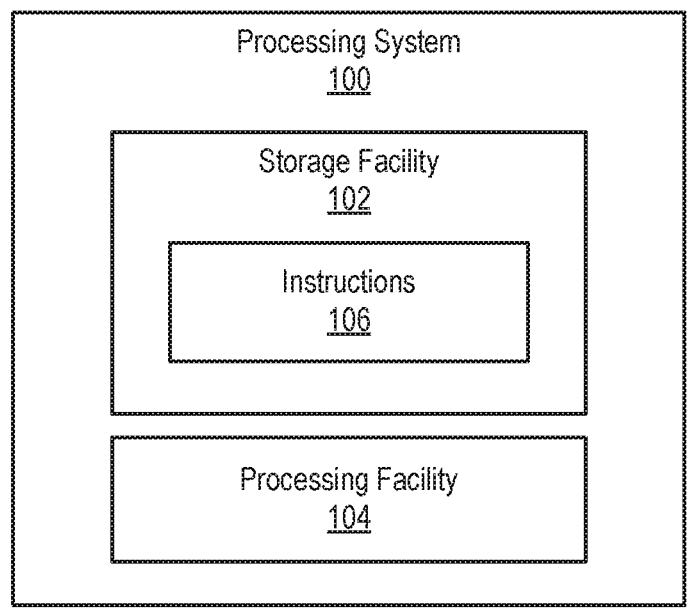
FIG. 1 illustrates an exemplary processing system according to principles described herein.

Systems and methods for using model data to generate an enhanced depth map in a computer-assisted surgical system are described herein. In certain implementations, for example, a processing system of a computer-assisted surgical system identifies an object (e.g., a surgical instrument) in a surgical space. The processing system accesses a model of the object (e.g., model data representative of a computer-assisted design (CAD) model). The processing system identifies a pose of the object (e.g., a position and an orientation of the object) in the surgical space and aligns the model with the pose of the object to define depth data for the model in the surgical space. The processing system generates a depth map in the surgical space for at least a portion of the object based on the depth data for the model. For example, the processing system may use the model data representative of the model of the object to generate, based on the alignment of the model with the pose of the object, an enhanced depth map that includes both sensed depth information for points in the surgical space and modeled depth information for points in the surgical space.

The computer-assisted surgical system may use the depth map in one or more ways that may provide improvements compared to use of a depth map that is not enhanced with model data. For example, the processing system of the computer-assisted surgical system may use an enhanced depth map to generate augmented imagery of the surgical space, such as by inserting graphical elements (e.g., virtual objects, synthetic objects, graphical enhancements, user interface components etc.) into captured imagery (e.g., one or more images captured with one or more cameras) of the surgical space to form the augmented imagery. The enhanced depth map may help in augmenting the imagery, such as when inserting graphical elements in the imagery relative to objects depicted in the imagery. For instance, the enhanced depth may be used to determine where and/or how to insert a graphical element into captured imagery of the surgical space such that the inserted graphical element is positioned realistically relative to a depiction of an object such as a surgical instrument in the captured imagery of the surgical space. For example, the graphical element may include a halo element realistically positioned around the surgical instrument to visually indicate a status or attribute of the surgical instrument (e.g., to visually indicate when the surgical instrument is active in some manner, such as being manipulated, being selected, outputting energy, receiving input, etc.). The halo element may be presented intuitively and/or with visual consistency by the computer-assisted surgical system using the enhanced depth map to determine where the visibility of the halo element should be occluded by the surgical instrument and vice versa.

Methods and systems described herein for using model data to generate enhanced depth maps in a computer-assisted surgical system may provide various advantages and benefits. For example, for various reasons, in a conventional depth map, there may be points with depth values that are missing, unreliable, and/or difficult to determine, such as points associated with edges of objects and/or portions of objects close to a viewpoint into the surgical space (e.g., a viewpoint of a camera capturing imagery of the surgical space). Using model data or other known data as described herein may allow the processing system to fill in certain missing depth data and/or replace certain unreliable data with known and reliable depth data to generate an enhanced depth map of the surgical space. The enhanced depth map may be used by the computer-assisted surgical system to perform one or more operations, such as to augment imagery of the surgical space. Augmented imagery may provide surgeons with additional and/or intuitive information to aid in performing computer-assisted surgeries.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary processing system 100 configured to use model data to generate an enhanced depth map in a computer-assisted surgical system. Processing system 100 may be implemented within one or more components of a computer-assisted surgical system. As shown in FIG. 1, processing system 100 includes a storage facility 102 and a processing facility 104 selectively and communicatively coupled to one another. Each of facilities 102 and 104 may include or be implemented by one or more physical computing devices including hardware and/or software components such as processors, memories, storage drives, communication interfaces, instructions stored in memory for execution by the processors, and so forth. Although facilities 102 and 104 are shown to be separate facilities in FIG. 1, facilities 102 and 104 may be combined into fewer facilities, such as into a single facility, or divided into more facilities as may serve a particular implementation. In some examples, each of facilities 102 and 104 may be distributed between multiple devices and/or multiple locations as may serve a particular implementation.

Storage facility 102 may maintain (e.g., store) executable data used by processing facility 104 to perform any of the operations described herein. For example, storage facility 102 may store instructions 106 that may be executed by processing facility 104 to perform any of the operations described herein. Instructions 106 may be implemented by any suitable application, software, code, and/or other executable data instance.

Storage facility 102 may also maintain any data received, generated, managed, used, and/or transmitted by processing facility 104. For example, as will be described below in more detail, storage facility 102 may maintain model data, object data, image data, graphical elements, and the like.

Processing facility 104 may be configured to perform (e.g., execute instructions 106 stored in storage facility 102 to perform) various processing operations associated with using model data to generate an enhanced depth map in any of the ways described herein.

Figure 2:
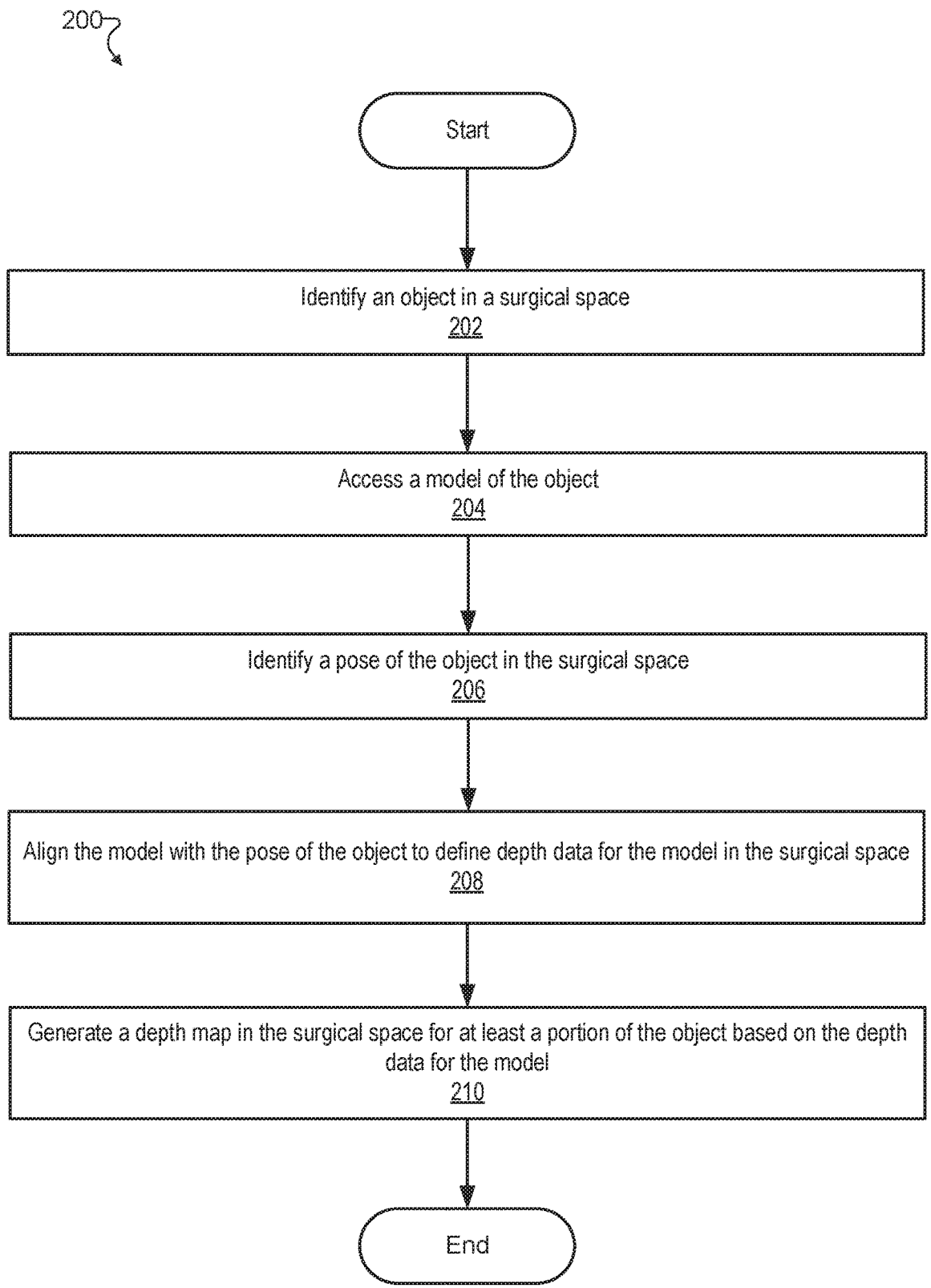
FIG. 2 illustrates an exemplary method for using model data to generate an enhanced depth map in a computer-assisted surgical system according to principles described herein.

FIG. 2 illustrates an exemplary method 200 for using model data to generate an enhanced depth map in a computer-assisted surgical system. While FIG. 2 illustrates exemplary operations according to one embodiment, other embodiments may omit, add to, reorder, and/or modify any of the operations shown in FIG. 2. One or more of the operations shown in FIG. 2 may be performed by processing system 100, any components included therein, and/or any implementation thereof.

In operation 202, a processing system identifies an object in a surgical space. The processing system may identify the object in the surgical space in any suitable way. For example, processing system 100 may access and process imagery of the surgical space to identify the object in the surgical space. Processing system 100 may utilize any suitable image processing technologies to identify the object in imagery of the surgical space, such as feature recognition technologies and/or machine learning technologies. For instance, processing system 100 may use any suitable image processing technologies to identify shapes of objects in imagery of surgical spaces and compare the shapes with known objects. Processing system 100 may additionally or alternatively detect and use visual indicators on the objects, such as unique features, visual key points, markings, serial numbers, or any other such visually identifiable characteristic. As another example, processing system 100 may additionally or alternatively receive information regarding objects in the surgical space from the computer-assisted surgical system and/or a user of the computer-assisted surgical system. For instance, processing system 100 may receive information indicating a type of an object in the surgical space or other such object information (e.g., information indicating that the object is a surgical instrument or a particular type of surgical instrument).

In operation 204, the processing system accesses a model of the object such as by accessing model data representative of a model of the object. Model data may represent any suitable three-dimensional model of the object or portion of the object. For example, the model data may represent a CAD model, portions of a CAD model, or other such model of the object. The processing system may access the model data from any suitable source, such as by accessing model data stored by storage facility 102 of processing system 100. Alternatively or additionally, the processing system may access model data from other sources communicatively coupled to the processing system, such as data storage facilities of the computer-assisted surgical system and/or from data stores communicatively coupled to the computer-assisted surgical system (e.g., via the internet).

In operation 206, the processing system identifies a pose of the object in the surgical space. The pose may include a position and an orientation of the object that convey where the object is located in the surgical space and how the object is oriented in the surgical space. The processing system may identify the pose of the object in the surgical space in any suitable way. For example, the processing system may access data representative of the pose of the object from one or more components of the computer-assisted surgical system. As another example, the processing system may determine the pose of the object based on kinematics data generated by the computer-assisted surgical system (e.g., kinematics data indicating a position and an orientation of a surgical instrument that is manipulated by way of the computer-assisted surgical system) and/or imagery of the surgical space (e.g., imagery captured by an imaging device such as an endoscope that is manipulated by way of the computer-assisted surgical system).

As the object moves in the surgical space, the processing system may identify new poses of the object. Thus, the pose of the object may be tracked in real time. Real time tracking may be implemented in various ways. For example, real time tracking of the object may include using visual indicators on the object to identify the pose of the object. Alternatively or additionally, real time tracking may include accessing kinematic information of the object. For example, the object may be coupled to a manipulator arm of the computer-assisted surgical system. The manipulator arm may include one or more displacement transducers, orientational sensors, and/or positional sensors used to generate kinematic information representative of the position and/or the orientation of the object. In some examples, the object may additionally or alternatively include one or more such sensors to generate kinematic information. The kinematic information may be processed by the processing system to help determine the pose of the object.

In operation 208, the processing system aligns the model with the pose of the object to define depth data for the model in the surgical space. For example, processing system 100 may rotate the model in one or more (e.g., three) dimensions to align the model to the orientation of the object in the surgical space. Processing system 100 may also position the model to align the position of the model with the position of the object in the surgical space. The alignment of the model with the pose of the object may define depth data for the model in the surgical space. Once the model is oriented and positioned to align with the pose of the object, processing system 100 may use the aligned model to generate an enhanced depth map.

In operation 210, the processing system generates an enhanced depth map in the surgical space for at least a portion of the object based on the depth data for the model. For example, the processing system may use model data representative of the model to generate, based on the alignment of the model with the pose of the object, an enhanced depth map that includes both sensed depth information for points in the surgical space and modeled depth information for points in the surgical space. Depth information for each point in the surgical space may represent a distance between the point and a viewpoint from which the surgical space is viewed (e.g., a viewpoint associated with a camera capturing imagery of the surgical space). As the viewpoint may be a point positioned along a z-axis in a third dimension orthogonal to two dimensions (x and y dimensions) of an image captured from the viewpoint, the distances from the viewpoint to points (e.g., points in the surgical space and/or points of an object model aligned with the pose of an object in the surgical space) may provide depth data in the third (z) dimension.

Sensed depth information for points in the surgical space may be determined in various ways. For example, any suitable depth sensing technologies may be used to sense depth information for the surgical space. To illustrate one example, processing system 100 may determine depth information from stereoscopic imagery of the surgical space captured by stereoscopic cameras. The stereoscopic imagery may provide a plurality of viewing angles of the surgical space, from which processing system 100 may determine depth information for points in the surgical space. Alternatively or additionally, processing system 100 may determine depth information for points in the surgical space using any other suitable depth sensing technologies, such as instruments and/or systems configured to determine distances from the instrument and/or system to points in the surgical space. Examples of such instruments and/or systems include radar, lidar, sonar, time of flight, dot projection, etc. instruments and systems.

Modeled depth information for points in the surgical space may be determined in various ways. For example, processing system 100 may align the model of the object with the pose of the object in the surgical space (in operation 208) in any of the ways described herein. Such an alignment may include, for example, sizing (e.g., resizing) the model to match a size of the object in the surgical space (e.g., a size of the object as depicted in imagery of the surgical space captured from a viewpoint), positioning the model to match a position of the object in the surgical space, and rotating the model in one or more dimensions to match an orientation of the object in the surgical space. Processing system 100 may set depth values for certain points on the aligned model to match determined depth values for certain points of the object in the surgical space. Processing system 100 may use the set depth values for the certain points on the model and the model data representing the model to determine depth values for other points on the model. For instance, if processing system 100 determines that one end of an aligned object model is 10 millimeters away from the viewpoint, processing system 100 may be able to use this depth value to determine the depth information for other points (e.g., the remainder of the points) on the model based on the model data and the alignment of the model with the pose of the object in the surgical space. The determined depth values for points on the model may be used by processing system 100 to fill in for missing and/or unreliable points that may exist in a depth map that is generated conventionally without using the model. Thus, using the model data, processing system 100 may generate an enhanced depth map, which may include more accurate depth information than would exist in a depth map generated without using the model data.

The processing system may use model data to generate an enhanced depth map in any suitable way. Exemplary ways of generating an enhanced depth map are described herein.

Figure 3:
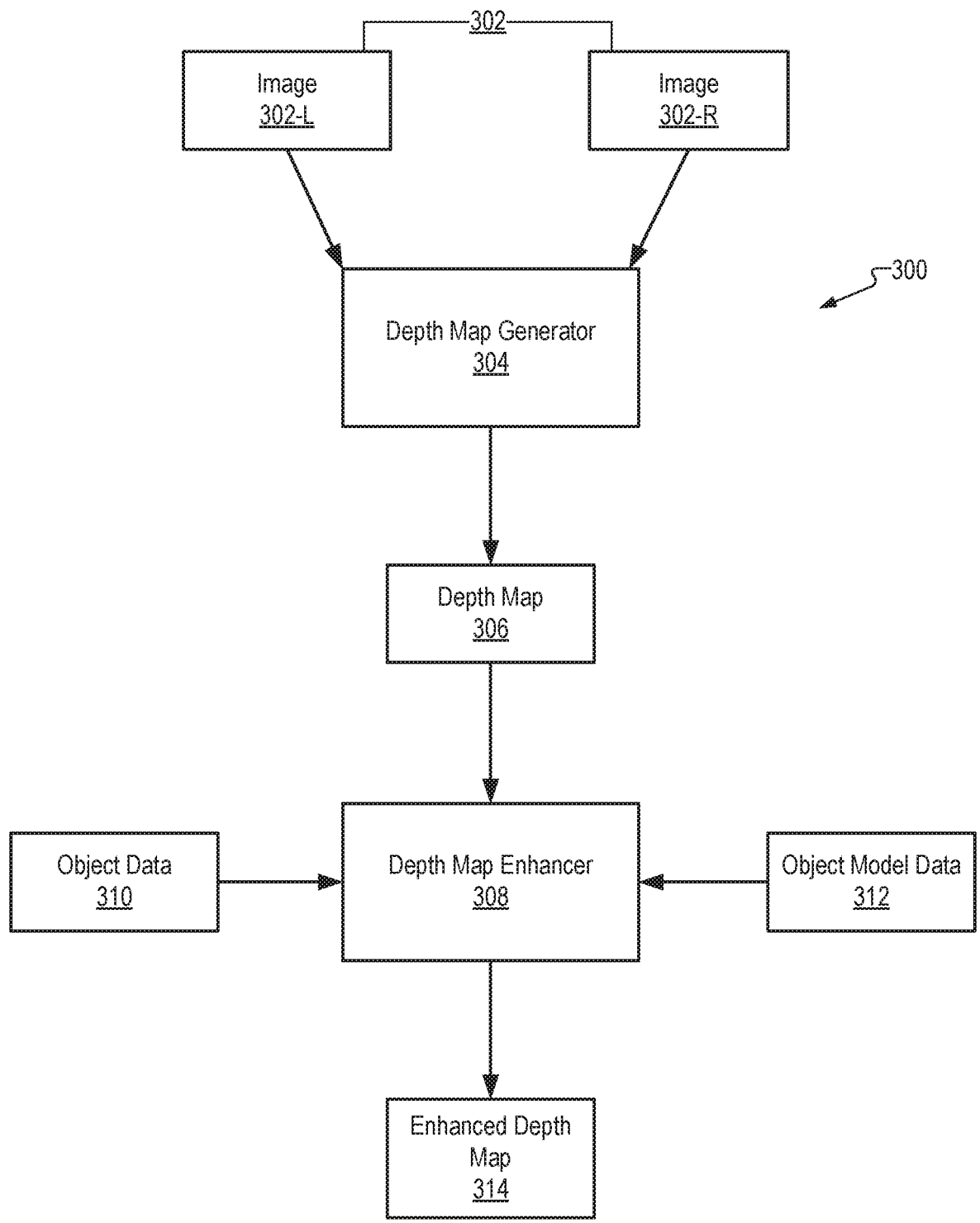
FIG. 3 illustrates an exemplary configuration for using model data to generate an enhanced depth map in a computer-assisted surgical system according to principles described herein.

FIG. 3 illustrates an exemplary configuration 300 for using model data to generate an enhanced depth map in a computer-assisted surgical system. Configuration 300 may be implemented by processing system 100 and/or any suitable components of a computer-assisted surgical system.

As shown, configuration 300 includes a depth map generator 304 that receives imagery 302 of a surgical space. Imagery 302 may be captured by any suitable imaging device or tool, such as an endoscope, a fluoroscope, or any such device with one or more cameras. In FIG. 3, imagery 302 is shown as stereoscopic imagery that includes a left image 302-L and a right image 302-R. Stereoscopic imagery may be used by depth map generator 304 to determine a depth map 306 that includes depth information for points in the surgical space. As left image 302-L and right image 302-R of imagery 302 provide different viewing angles of the surgical space, depth map generator 304 may use imagery 302 to determine depth values for points in the surgical space. In some examples, depth map generator 304 receives imagery 302 of the surgical space continually and generates depth maps of the surgical space in real time. For example, depth map generator 304 may generate depth maps at 60 hertz or other such frequency based on real-time stereoscopic imagery of the surgical space.

Depth map 306 may be an initial depth map including depth information for points in the surgical space, which depth information is based on depth sensing of the surgical space. Depth map 306 may include points for which depth information is unreliable, unknown, or difficult to determine. Depth information for portions of depth map 306 may be unreliable, unknown, or difficult to determine for various reasons. For example, the surgical space may include objects, such as surgical instruments, tissue of a patient, etc. located at varying depths in the surgical space, resulting in points adjacent to each other in imagery 302 having varying and sometimes significantly different depth values. Such differing depth values close to one another on imagery 302 may be problematic as some algorithms for determining depth values for a depth map may determine depth values for a subset of the points and interpolate depth information for a remainder of the points rather than determine depth values for every point, which may enable depth map generator 306 to generate depth maps in real time. Real time generation of depth maps may limit the computational resources that may be applied to determine depth information for each point from stereoscopic image data. Additionally, points that are too close to an imaging device may have depth information that is difficult to determine using stereoscopic image data from the imaging device.

Configuration 300 includes a depth map enhancer 308 that accesses depth map 306, as well as object data 310 and object model data 312. Object data 310 may include information regarding an object (e.g., a surgical instrument) in the surgical space. Object data 310 may include information specifying a type of the object, for example, including a model number, a model type, an instrument type, etc. Object data 310 may also include a pose of the object, including a position and an orientation of the object in the surgical space. Object data 310 may be determined and/or accessed in any suitable way as described herein.

Object model data 312 may be representative of a model of the object. Object model data 312 may be determined and/or accessed in any suitable way as described herein.

Depth map enhancer 308 uses object data 310 and object model data 312 to modify depth map 306 to generate an enhanced depth map 314. For example, depth map enhancer 308 may align the model of the object with the pose of the object in the surgical space and modify depth map 306 using depth information determined from object model data 312 based on the alignment of the model with the pose of the object in the surgical space. Depth map enhancer 308 may modify portions of depth map 306 corresponding to the object in the surgical space. For example, depth values for points on the object may be modified based on model data for the aligned object model, such as by replacing the depth values for the points on the object with depth values that are determined by depth map enhancer 308 based on the depth values for points on the aligned object model.

Depth map enhancer 308 may additionally or alternatively modify portions of depth map 306 that do not correspond to the object in the surgical space. For example, depth values for points not on the object may be modified based on the model data for the aligned object model, such as by replacing the depth values for the points not on the object with depth values that are determined by depth map enhancer 308 based on the aligned object model. Examples of modifying depth information for points not on the object, based on model data for the aligned object model, are described herein.

The modification of depth map 306 may include replacing unreliable, unknown, and/or difficult to determine depth data with depth data that is determined based on the aligned object model. The model-based depth data may represent reliable and/or known depth values that effectively transform depth map 306 into enhanced depth map 314 that may be more reliable, accurate, and/or complete than depth map 306.

Figure 4:
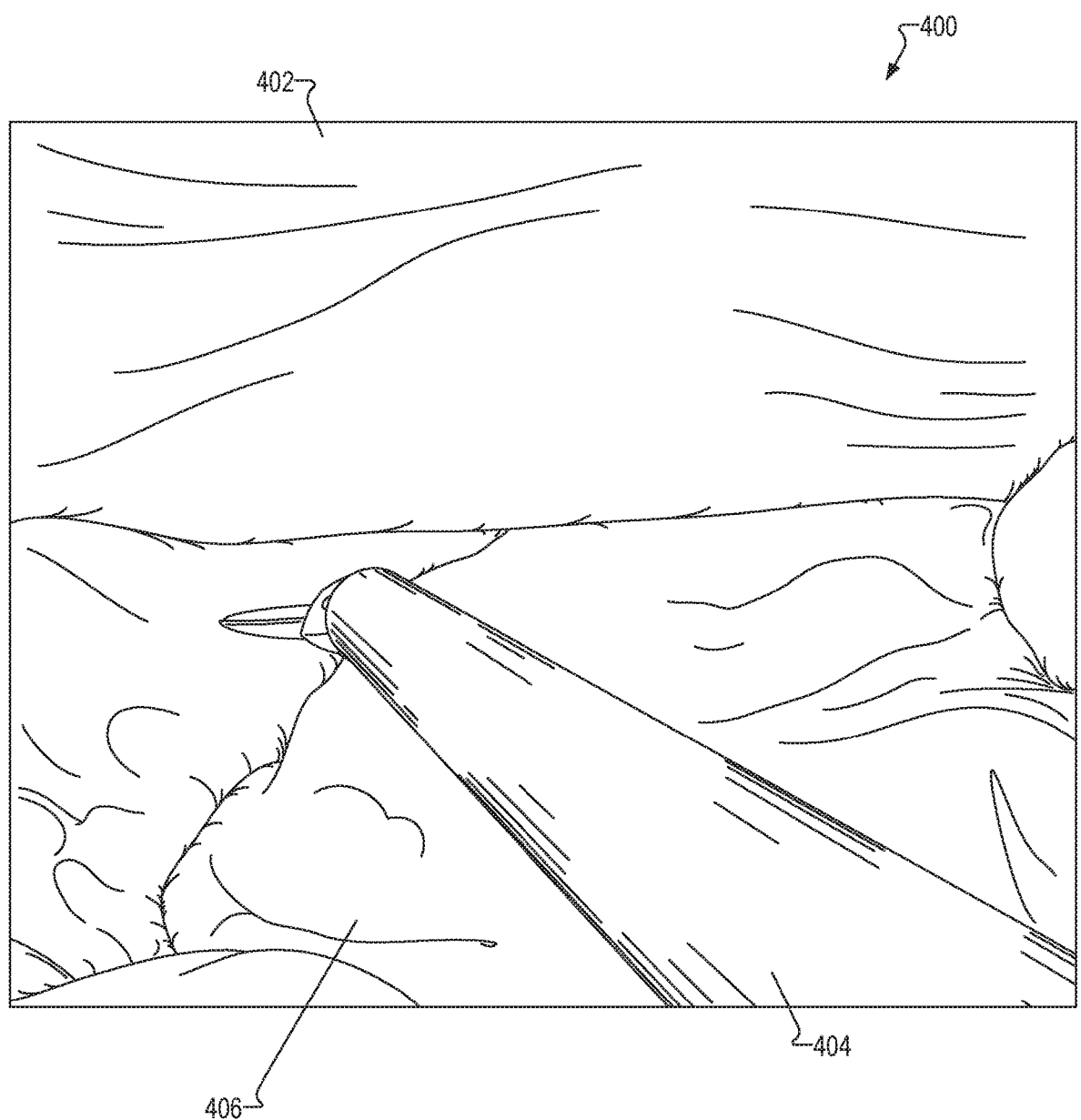
FIG. 4 illustrates an exemplary image of a surgical space according to principles described herein.

Exemplary implementations of elements of FIG. 3 will now be described with reference to other figures. For example, FIG. 4 illustrates an example image 400 of a surgical space 402. Image 400 may be included in or derived from imagery 302 of surgical space 402. As described, image 400 may be captured using any appropriate camera(s), such as those on any suitable imaging device or devices, such as one or more endoscopes, fluoroscopes, etc.

Image 400 may be displayed to a surgeon and/or surgical team to help the surgeon to perform a surgical procedure. The surgeon may manipulate surgical instruments in surgical space 402 via a user control mechanism of a computer-assisted surgical system. An example computer-assisted surgical system will be described below in more detail.

As shown in image 400, surgical space 402 includes objects such as a surgical instrument 404 and tissue 406 of a patient. Processing system 100 may identify surgical instrument 404 and other such objects depicted in image 400 in any suitable way, including any of the ways described herein.

Figure 5:
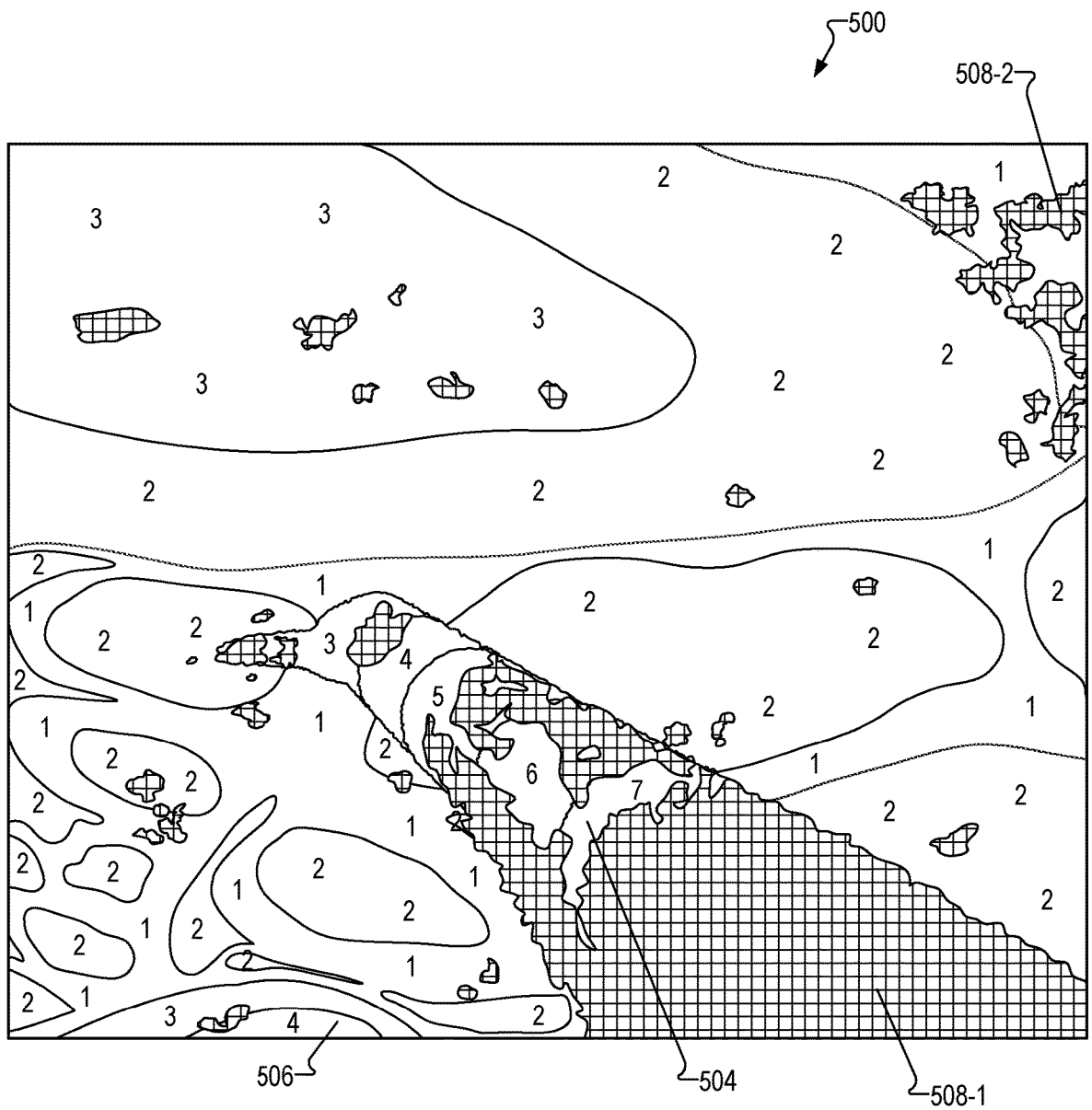
FIG. 5 illustrates an exemplary depth map according to principles described herein.

FIG. 5 illustrates an example depth map 500, which may be an implementation of depth map 306. Depth map 500 may be an initial depth map of surgical space 402. Processing system 100 may determine depth map 500 in any suitable manner. For example, processing system 100 may determine depth map 500 from imagery associated with image 400. Alternatively or additionally, processing system 100 may access depth map 500 from an instrument and/or system that generated depth map 500 in any suitable way.

Depth map 500 shows depth information for points in surgical space 402 from a viewpoint (e.g., a viewpoint of a camera). The depth information is shown in depth map 500 using different shades of gray. Darker shades represent points that are farther away from the viewpoint, while lighter shades represent points that are closer to the viewpoint. While depth map 500 shows depth information using a discrete number of shades for clarity, depth maps may use more shades, a more gradual gradation of a spectrum, etc. Alternatively or additionally, depth information may be represented in any suitable way. For instance, points may be colored using a color spectrum, with points farther away from the viewpoint colored with one end of the color spectrum and points closer to the viewpoint colored with another end of the color spectrum. Any such appropriate visualization and/or data representation may be used to convey the depth information, such as black and white gradations, color intensities, contour maps, etc.

Depth map 500 shows depth information for points in surgical space 402 from a viewpoint (e.g., a viewpoint of a camera). The depth information is shown in depth map 500 using different numbers. Larger numbers represent points that are farther away from the viewpoint, while smaller numbers represent points that are closer to the viewpoint. While depth map 500 shows depth information using a discrete set of arbitrary numbers, this is for purposes of illustration in the present application. Depth information, including depth information in a depth map, may be represented using any quantification of depth (e.g., depth maps may use more numbers, a more gradual gradation of a spectrum, etc.). Thus, depth information may be represented in any suitable way, visually or non-visually. For instance, points may be colored using a color spectrum, with points farther away from the viewpoint colored with one end of the color spectrum and points closer to the viewpoint colored with another end of the color spectrum. Any such appropriate visualization and/or data representation may be used to convey the depth information, such as black and white gradations, color intensities, contour maps, etc.

Depth map 500 shows depth information 504 for surgical instrument 404 and depth information 506 for tissue 406 of the patient. Depth information 504 shows, by way of different numbers, that surgical instrument 404 is positioned in surgical space 402 such that a distal end of surgical instrument 404 is farther away from the viewpoint than a middle portion of surgical instrument 404. Depth information 506 shows, by way of different numbers, that tissue 406 is positioned in surgical space 402 such that some tissue 406 is farther away from the viewpoint than the distal end of surgical instrument 404, while other tissue 406 is a similar distance away from the viewpoint or nearer to the viewpoint than the distal end of surgical instrument 404. Depth map 500 also includes crosshatched portions 508 (e.g., crosshatched portions 508-1 and 508-2) that show missing or unreliable depth data for points for which depth information could not be or was not determined. Crosshatched portion 508-1 represents unknown depth information for points toward a proximal end of surgical instrument 404. Crosshatched portion 508-2 represents unknown depth information for points on tissue 406.

Figure 6:
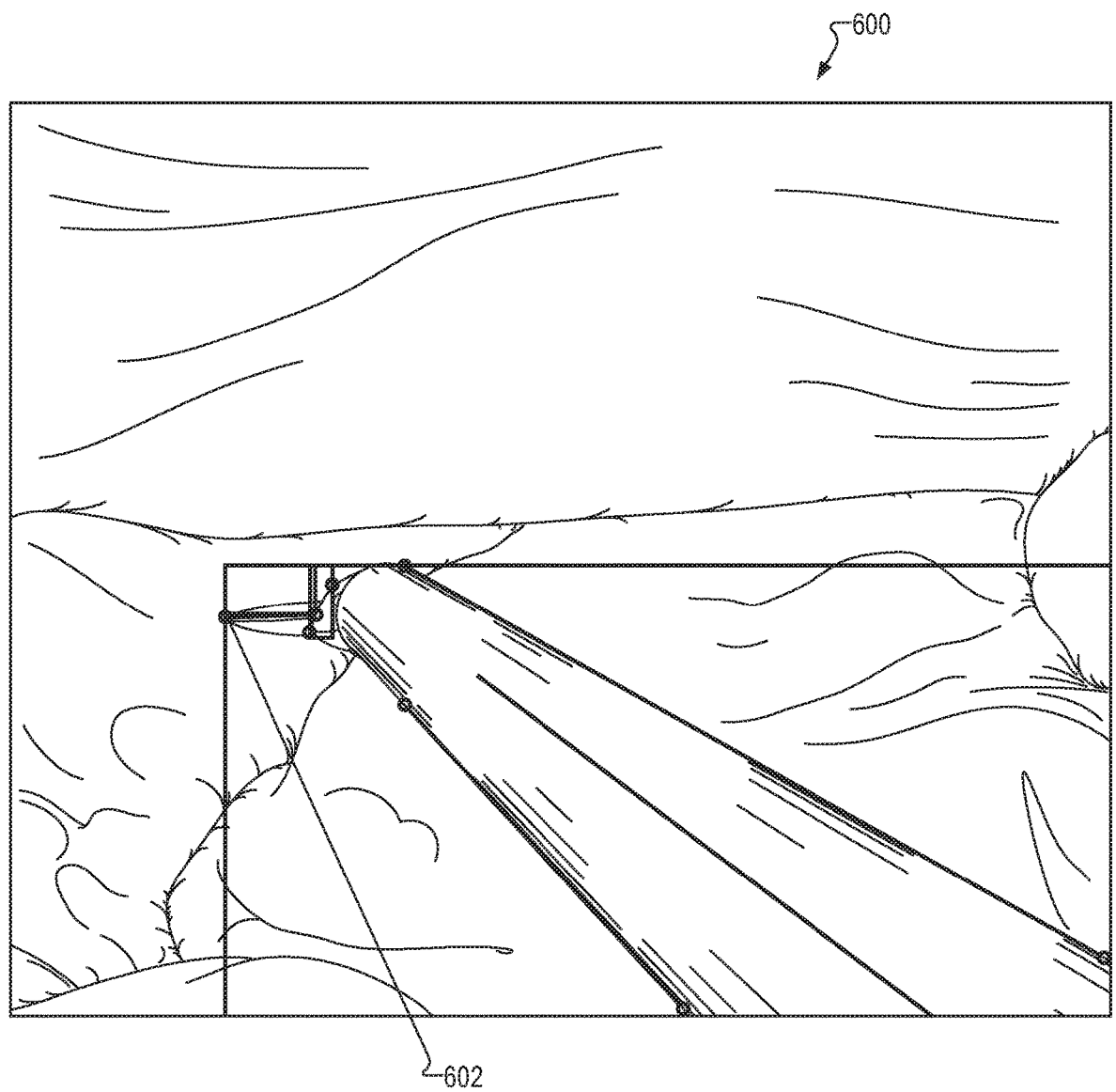
FIG. 6 illustrates exemplary positional data that may be used to determine a pose of a surgical instrument in a surgical space according to principles described herein.

FIG. 6 is an exemplary image 600 of surgical space 402. As shown, image 600 visually depicts positional data 602 of surgical instrument 404 included in surgical space 402. Positional data 602 may represent any information about the pose of surgical instrument 404 in surgical space 402 or usable to determine the pose of surgical instrument in surgical space 402. For example, positional data 602 may represent positions of certain markers or features of surgical instrument 404 in surgical space 402. In certain examples, positional data 602 may be included in object data 310. Image 600 is a composite image showing real time tracking of surgical instrument 404. As described above, real time tracking may be implemented using visual data and/or kinematics data to determine the pose of surgical instrument 404.

Figure 7:
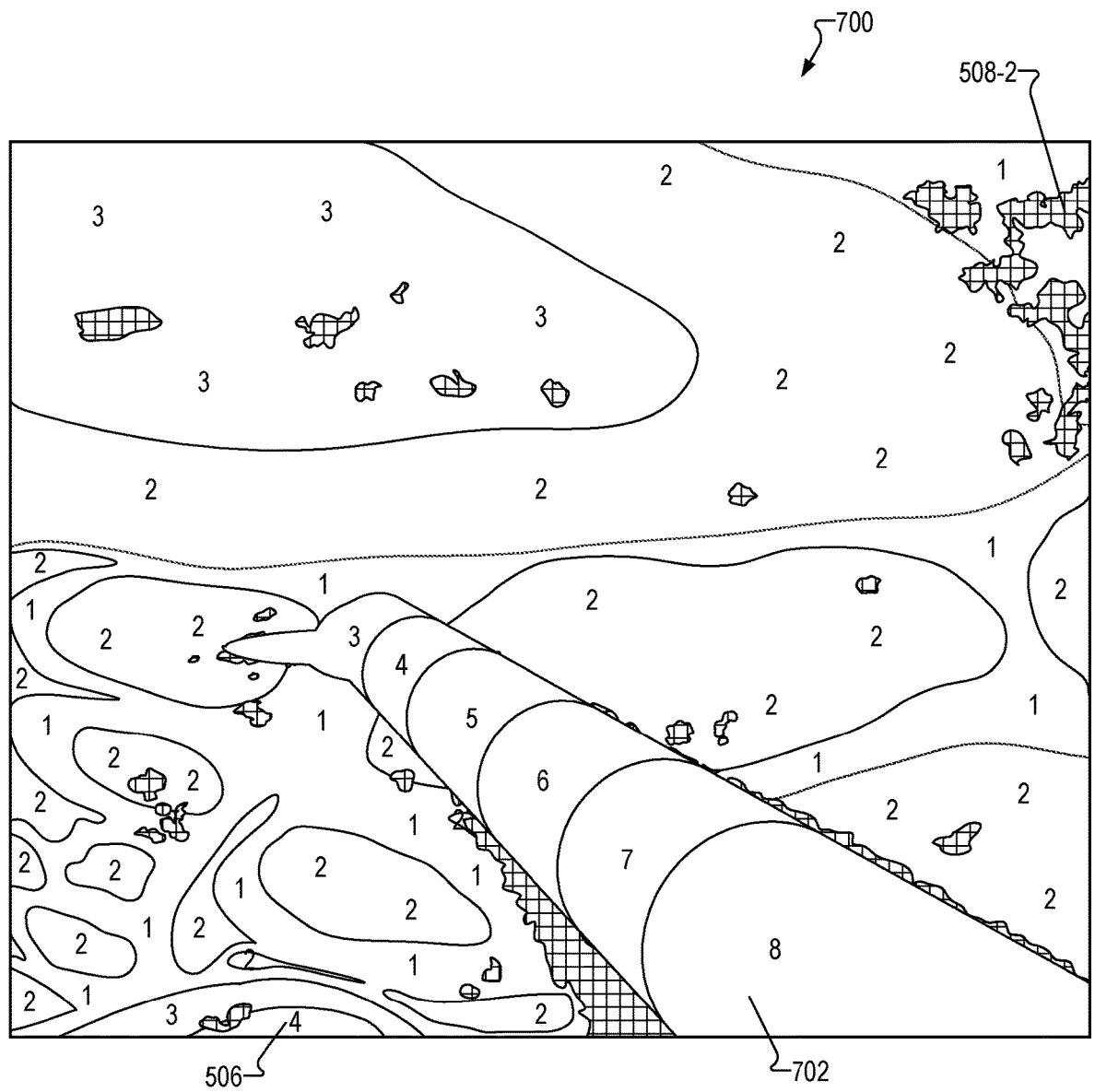
FIGS. 7-9 illustrate exemplary enhanced depth maps according to principles described herein.

FIG. 7 illustrates an example enhanced depth map 700, which may be an implementation of enhanced depth map 314. As described above, model data or portions of model data (e.g., object model data 312) may be used by depth map enhancer 308 to modify an initial depth map to generate an enhanced depth map. For example, depth map enhancer 308 may use object model data 312 to modify depth map 500 to generate enhanced depth map 700. As shown in FIG. 7, enhanced depth map 700 represents depth map 500 enhanced with depth information 702 for points on a model of surgical instrument 404. As described herein, depth map enhancer 308 may align the model with the pose of surgical instrument 404 in surgical space 402 and use object model data 312 representative of the model to determine depth information 702 for points on the aligned model of surgical instrument 404 in surgical space 402. Depth information 702 represents depth values for points on the aligned model. As shown in FIG. 7, depth information 702 in enhanced depth map 700 has replaced at least some of known depth information and unknown depth information included in depth map 500. For example, crosshatched portion 508-1 representing unknown depth values for points on surgical instrument 404 in depth map 500 has been replaced with known depth information 702 for the aligned model of surgical instrument 404 (i.e., known depth values for points on the aligned model of surgical instrument 404). Because the aligned model of surgical instrument 404 is used to determine depth values of surgical instrument 404 in depth map 700, the depth values may accurately represent depth information of surgical instrument 404 in enhanced depth map 700, including depth information for edges of surgical instrument 404 and/or a proximal portion of the shaft of surgical instrument 404 that is near the viewpoint. Thus, enhanced depth map 700 may include depth values that represent clean edges of surgical instrument 404, which may be useful for certain features of a computer-assisted surgical system that utilize depth maps.

In certain examples, enhanced depth map 700 may represent an enhanced depth map in which only depth information for points on surgical instrument 404 are modified based on model data representing the model. Depth information for other points of surgical space 402 are not modified based on model data representing the model of surgical instrument 404. For example, depth information 506 for points on tissue 406 may remain the same as in depth map 500, while known and/or unknown depth information 504 for points on surgical instrument 404 is modified, based on the aligned model of surgical instrument 404, to become enhanced depth information 702.

In certain examples, depth map enhancer 308 may use the aligned model of surgical instrument 404 to generate an enhanced depth map, such as enhanced depth map 700, without altering the aligned model of surgical instrument 404 (e.g., without further altering the model of surgical instrument 404 after sizing, positioning, and rotating the model to align with the pose of surgical instrument 404 in surgical space 402). In other examples, depth map enhancer 308 may alter the aligned model of surgical instrument 404 and use the altered model of surgical instrument 404 to generate an enhanced depth map. For example, depth map enhancer 308 may alter the model or portions of the model by expanding the size of the model such that the model is slightly larger than surgical instrument 404 as represented in an initial depth map such as depth map 500. As another example, depth map enhancer 308 may add a buffer size to the model, such as a buffer (e.g., a border) that would cover points just outside the edge of surgical instrument 404. As another example, depth map enhancer 308 may perform a transformation on the model, such as by deforming the model from the original form of the model to account for a detected actual deformation of surgical instrument 404 in surgical space 402. For instance, the detect pose of surgical instrument 404 may indicate a deformation of surgical instrument 404, such as a deflection, bend, or other change in the shape of surgical instrument 404. Depth map enhancer 308 may alter the model or a portion of the model to account for (e.g., match) the deformation. Depth map enhancer 308 may alter the model as part of aligning the model to the pose of surgical instrument 404 or after the model is aligned to the pose of surgical instrument 404. Depth map enhancer 308 may use the altered model of surgical instrument 404 to generate the enhanced depth map in any of the ways described herein.

Such alterations to the model may cover for uncertainties such as uncertainties in identifying the pose of surgical instrument 404. If the pose of surgical instrument 404 cannot be determined within a threshold certainty, for example, the altered model may still be useful in enhancing the depth map by using a slightly inflated model or portion of the model that is configured to cover for such uncertainties.

Figure 8:
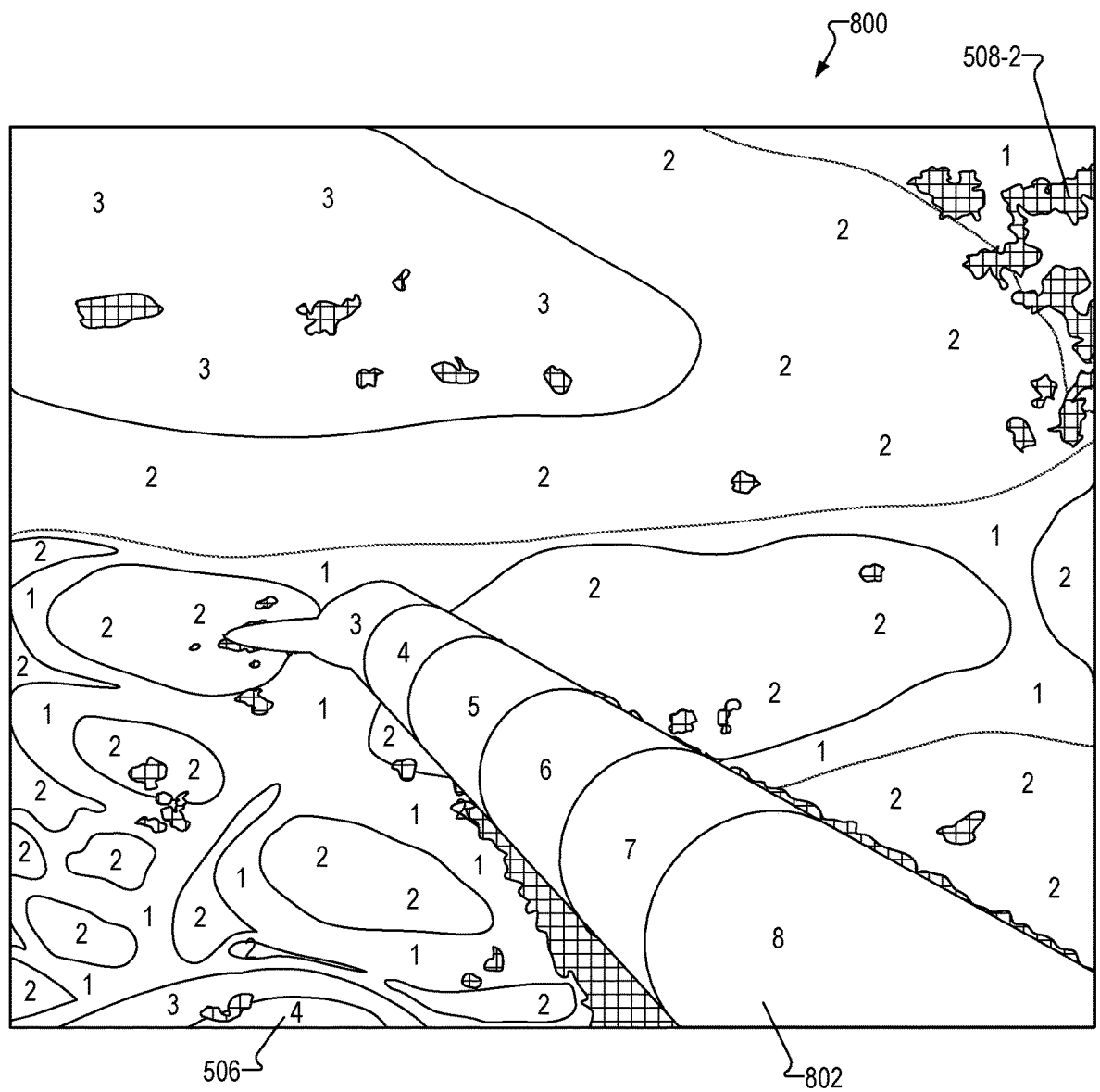

FIG. 8 illustrates another example enhanced depth map 800, which may be an implementation of enhanced depth map 314. Enhanced depth map 800 may be similar to enhanced depth map 700 except that an expanded model has been used by depth map enhancer 308 to generate enhanced depth map 800. As shown, enhanced depth map 800 includes depth information 802 for points on an expanded model of surgical instrument 404. Because the model has been expanded and used to generate enhanced depth map 800, depth information 802 may replace depth information 504 for surgical instrument 404 and some depth information 506 for tissue 406 positioned just outside of the depth information 504 for surgical instrument 404. As can be seen in FIGS. 7 and 8, some unknown depth information for points located along the shaft of surgical instrument 404 in enhanced depth map 700 of FIG. 7 has been replaced with depth information 802 in enhanced depth map 800, which is a result of depth map enhancer 308 using an expanded model to generate enhanced depth map 800. Enhanced depth maps 700 and 800 show depth information 702 and 802, respectively, for surgical instrument 404 with cleaner edges compared to depth information 504 for surgical instrument 404 in depth map 500. Depth information 802 is expanded in size relative to depth information 702 because of the expansion of the model used to generate enhanced depth map 800, and additional crosshatched portions 508-1 have been replaced by depth information 802 as compared to depth information 702.

Another example alteration of the model of surgical instrument 404 may include softening edges of the model. The softened edges may provide one or more benefits. For example, if surgical instrument 404 is moving, softened edges, rather than clean edges of surgical instrument 404 in the enhanced depth map may provide for a more visually consistent appearance when the enhanced depth map is used to generate augmented imagery of surgical space 402.

As another example alteration of the model of surgical instrument 404, depth map enhancer 308 may determine whether one or more portions of surgical instrument 404 are occluded by other objects in surgical space 402. For example, surgical instrument 404 may be partially behind another object, such as when surgical instrument 404 is partially embedded in tissue 406 of the patient. In such a case, depth map enhancer 308 may elect not to use certain model data to generate depth information for occluded points on surgical instrument 404, and rather may use depth information for points on the occluding object when generating an enhanced depth map. Such occlusions may be determined in various ways. For example, occlusions may be determined based on analysis of imagery 302 of the surgical space 402. Additionally or alternatively, occlusions may be determined based on any other suitable depth information for surgical space 402.

In certain examples, depth map enhancer 308 may be configured to use the aligned model of surgical instrument 404 to interpolate depth information for points of surgical space 402 that are not on surgical instrument 404 (e.g., depth information for points on tissue 406). For example, depth map enhancer 308 may use the aligned model of surgical instrument 404 to interpolate depth information for points located outside of the aligned model and for which the initial depth information is unknown (e.g., missing or unreliable). For instance, depth map enhancer 308 may determine that points outside the aligned model are likely to be tissue or other such objects in surgical space 402 that should have depth values that are similar to known depths values of other points on the tissue or other objects. Based on this determination, depth map enhancer 308 may fill in the missing depth values with depth values that are the same as or similar to known depth values for nearby points not on the aligned model. For example, for a first point that is not on the aligned model and for which depth information is unknown, depth map enhancer 308 may determine that, based on the first point not being on the aligned model, the first point is likely on tissue 406. Depth map enhancer 308 may identify a known depth value for a second point that is proximate to the first point and also not on the aligned model. Depth map enhancer 308 may use the known depth value for the second point to determine and assign a depth value to the first point.

Depth map enhancer 308 may be configured to interpolate depth information for points not on the aligned model in this manner for points that are located proximate to surgical instrument 404 and/or for points that are not located proximate to surgical instrument 404 in an initial depth map. For example, points near an edge of surgical instrument 404 may have missing depth information in an initial depth map such as depth map 500. After aligning the model of surgical instrument 404 with the pose of surgical instrument 404, depth map enhancer 308 may use model data for the aligned model to modify depth information for points on surgical instrument 404 and to interpolate depth information for points not on surgical instrument 404, such as the points near the edge of surgical instrument 404 that have missing depth information in the initial depth map. Additionally, in certain examples, other portions of the initial depth map that have missing depth information (e.g., points not near surgical instrument 404) may also be interpolated to have depths similar to nearby tissue, as those points are also determined to be outside the aligned model. Thus, depth map enhancer 308 may interpolate depth information for missing depth data in areas of depth map 500 other than surgical instrument 404 in addition to filling in missing depth data for surgical instrument 404.

Figure 9:
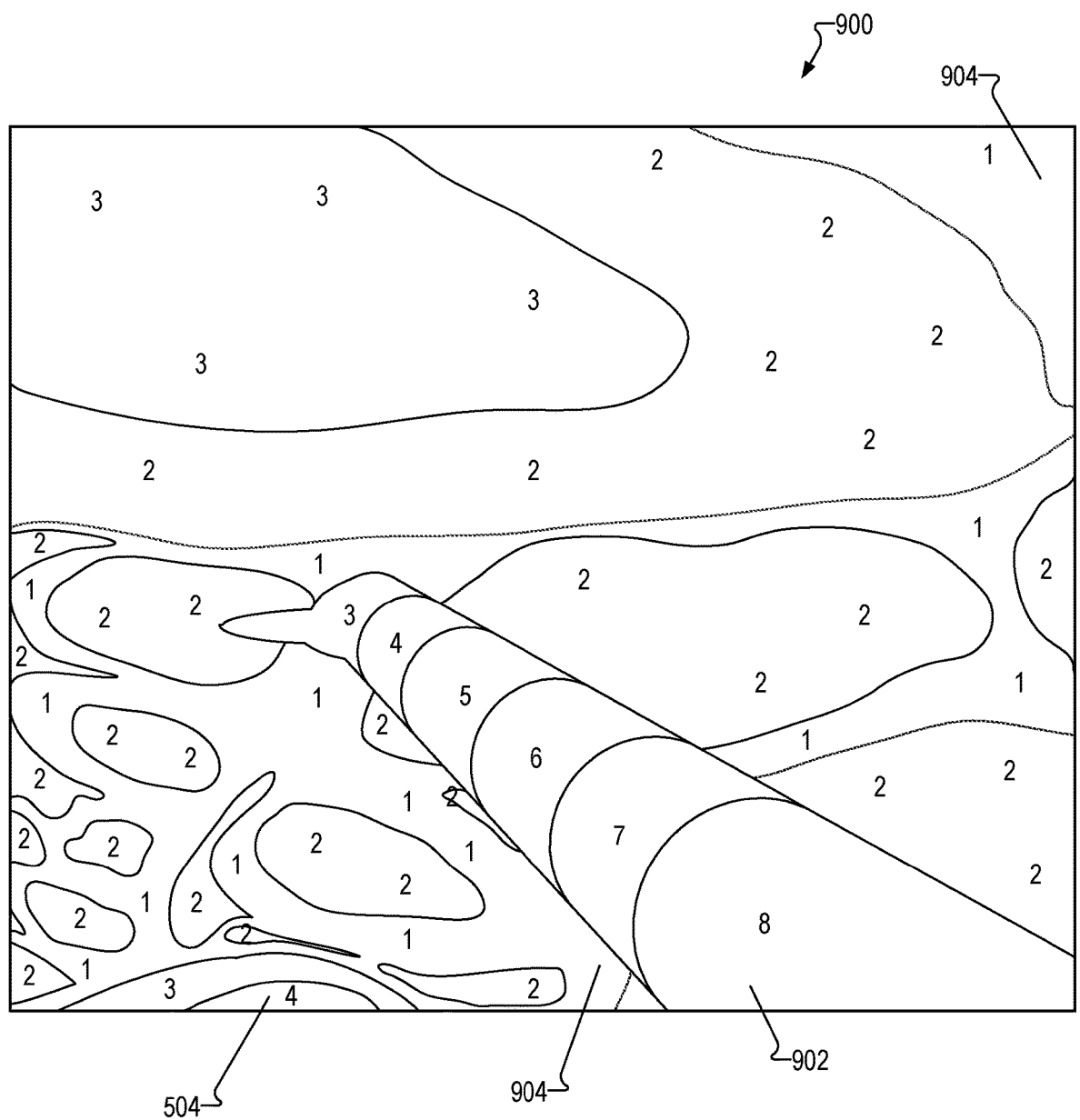

FIG. 9 illustrates another example enhanced depth map 900, which may be an implementation of enhanced depth map 314. Enhanced depth map 900 may be similar to enhanced depth map 700 except that the aligned model has also been used by depth map enhancer 308 to determine and fill in missing depth information for points outside of surgical instrument 404. For example, crosshatched portion 508-2 of depth map 500 and parts of crosshatched portion 508-1 of depth map that are not on surgical instrument 404 have been filled in with depth information 904 that has been interpolated by depth map enhancer 308 based on the aligned model and on known depth information for points that are not on the aligned model and are located proximate to crosshatched portions 508-1 and 508-2. Accordingly, enhanced depth map 900 includes initial known depth information 504 for tissue 406, depth information 902 for surgical instrument 404 that is determined using the aligned model of surgical instrument 404, and depth information 904 for tissue 404 that is interpolated using the aligned model of surgical instrument 404 and known depth information 504 for tissue 406.

Depth maps and depth information may be useful for various applications. For example, depth maps may be used to generate augmented imagery, provide relational positional information regarding objects, etc. For instance, captured imagery of a surgical space may be enhanced by inserting graphical elements, such as synthetic objects, user interface components, virtual objects, etc. The graphical elements may provide additional information to a viewer of the augmented imagery. For example, the graphical elements may provide visual highlighting to make an object more visible, or may provide information about or related to the object and/or the surgical space. For example, graphical elements may indicate, to a surgeon viewing the augmented imagery, information about a surgical instrument being used in a surgical procedure (e.g., an operational status of the surgical instrument) and/or information about points on tissue that are relevant to a surgical procedure.

In addition or alternative to insertion of graphical elements, augmented imagery may include alterations to captured imagery of surgical spaces. For example, in the augmented imagery, depictions of objects may be presented in different colors or with varying intensities and/or opacities. For example, an object may be shown in a specific color or changing colors to represent that the object is in use. For instance, an object may be a surgical instrument that transmits energy, such as a laser. As the laser transmits different amounts of energy, the laser may be shown with different corresponding colors that represent the different amounts of energy. As another example, objects or portions of objects may be shown as translucent or transparent, so that a viewer may see underlying tissue or other objects that are being occluded.

In an augmented image of a surgical space, graphical elements inserted into captured imagery of the surgical space may be presented in a visually consistent manner by using depth information to correctly occlude portions of the graphical elements if points in the imagery should be positioned in front of the portions of the graphical element and vice versa. The depth information allows processing system 100 and/or the computer-assisted surgical system to display the points closest to the viewpoint while hiding occluded points.

Compared to conventional depth maps, enhanced depth maps, such as any of the exemplary enhanced depth maps described herein, may be used to more effectively augment imagery of a surgical space. The enhanced depth maps may allow for more visually consistent presentation of inserted graphical elements in relation to objects in the surgical space. The visual consistency is particularly enhanced for a graphical element that is inserted in close proximity to a depiction of an object such as a surgical instrument when a model of the object is used to generate an enhanced depth map that is used to insert the graphical element into captured imagery of the surgical space. One reason for this improved visual consistency is that conventional depth maps of the surgical space often contain missing or unreliable depth information for points along edges of a surgical instrument, making it difficult to determine whether the points should occlude or be occluded by an inserted graphical element. An enhanced depth map, such as an exemplary depth map described herein, provides known and reliable depth information for points along edges of the surgical instrument, which may be used by processing system 100 and/or a computer-assisted surgical system to determine appropriate occlusions for the points that support visual consistency in augmented imagery.

Figure 10:
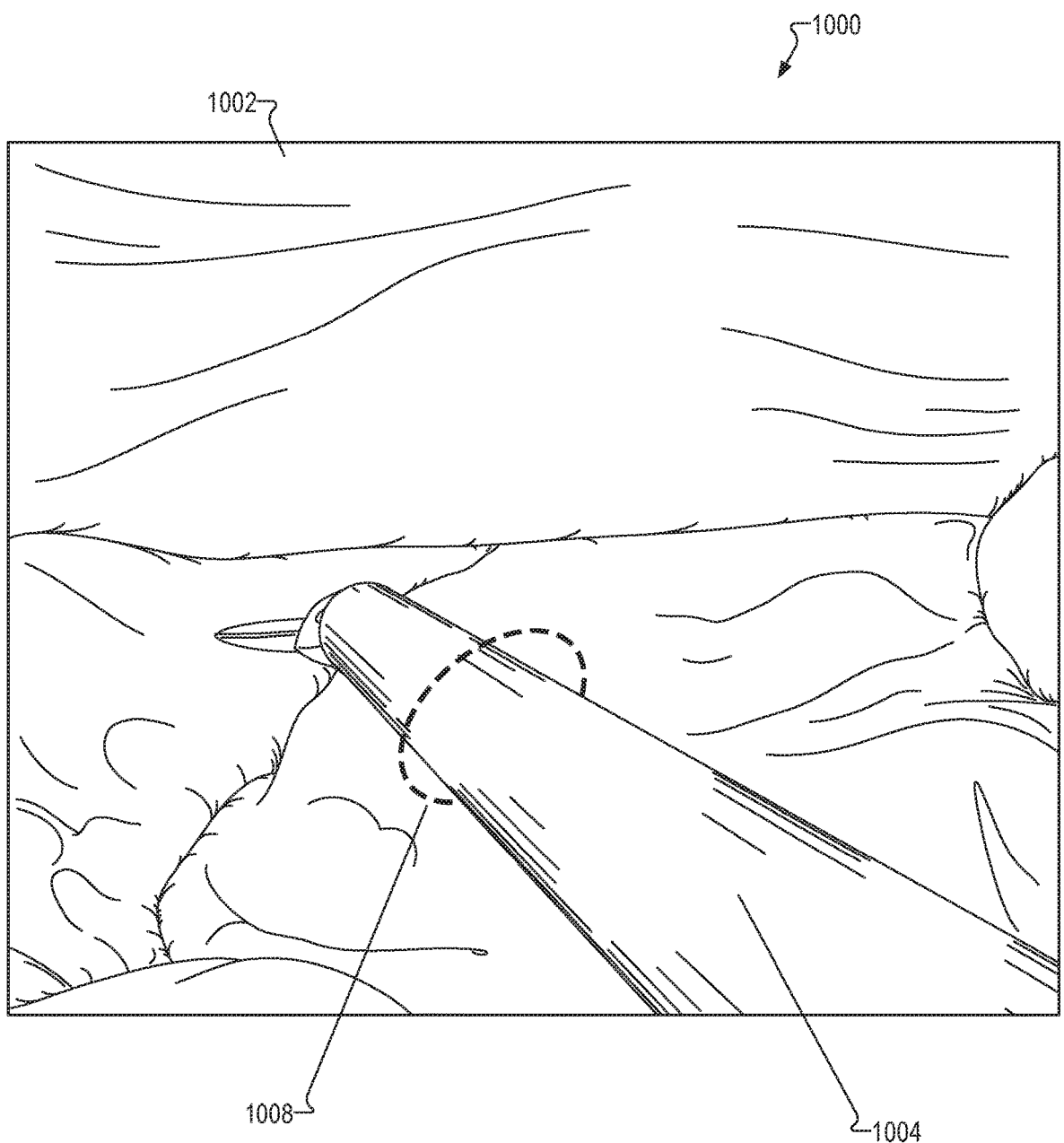
FIG. 10 illustrates exemplary augmented imagery of a surgical space that is generated based on an enhanced depth map according to principles described herein.

FIG. 10 illustrates an exemplary augmented image 1000 that is generated based on an enhanced depth map. As shown, a dashed-line ring 1008 is inserted into a captured image of a surgical space 1002 such that dashed-line ring 1008 encircles the shaft of a surgical instrument 1004. Dashed-line ring 1008 may be configured to provide information regarding surgical instrument 1004, such as information indicating that surgical instrument 1004 is active, inactive, selected, in use, parked, clutched, etc.). As shown, dashed-line ring 1008 may be presented in a visually consistent manner in augmented image 1002, such as by portions of dashed-line ring 1008 occluding the shaft of surgical instrument 1004 where in front and other portions of dashed-line ring 1008 being occluded by the shaft of surgical instrument 1004 where behind. Such accurate visual consistency may be enabled by use of an enhanced depth map to generate augmented image 1000. In contrast, having missing depth data, especially near edges of surgical instrument 1004, such as may be the case in a conventional depth map, may result in compositing issues, artifacts, and/or visual inconsistency when trying to augment imagery.

Certain examples described above have been described in reference to configuration 300 for using model data to generate an enhanced depth map in a computer-assisted surgical system. Processing system 100 may be configured to generate an enhanced depth map as described and illustrated in relation to configuration 300 and/or in any other suitable way. One or more of the examples and principles described above in reference to configuration 300 may also apply to other ways of using model data to generate an enhanced depth map. Another exemplary way of using model data to generate an enhanced depth map will now be described.

Figure 11:
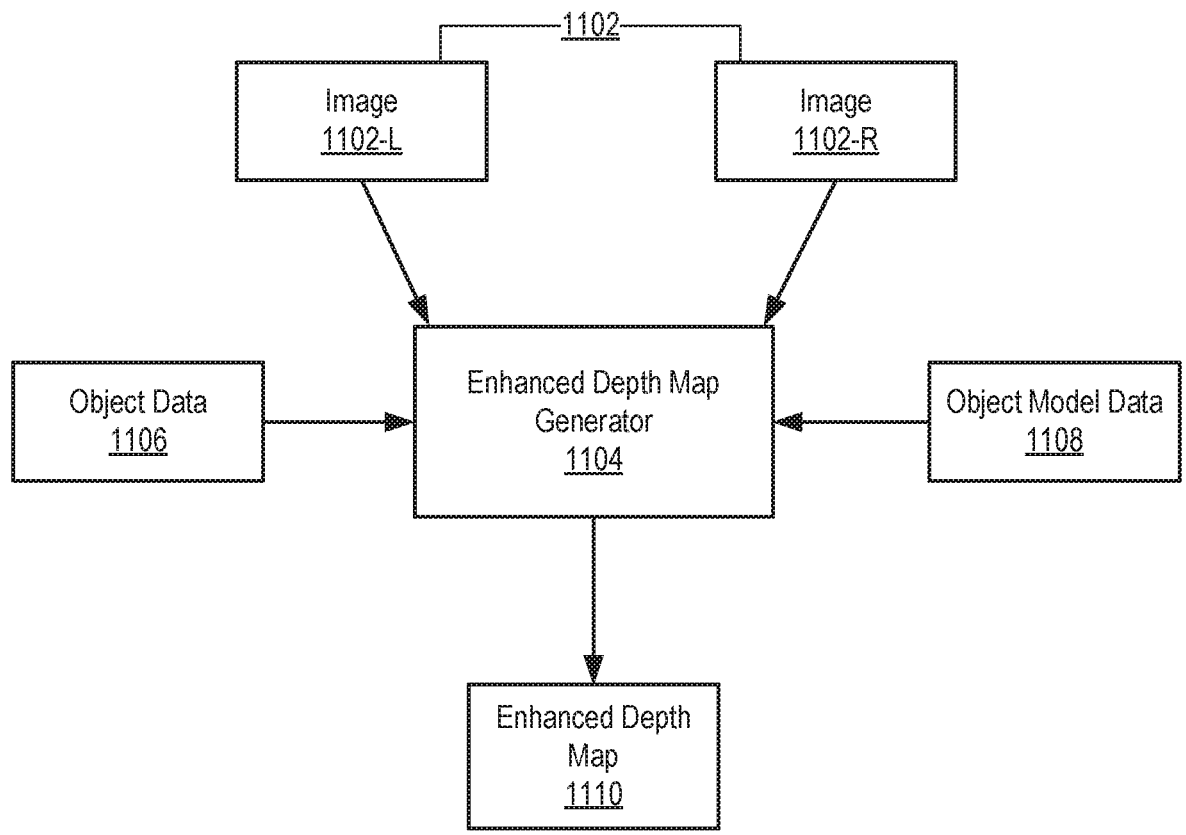
FIG. 11 illustrates an exemplary configuration for using model data to generate an enhanced depth map in a computer-assisted surgical system according to principles described herein.

FIG. 11 illustrates an exemplary configuration 1100 for using model data to generate an enhanced depth map in a computer-assisted surgical system. Configuration 1100 may be implemented by processing system 100 and/or any suitable components of a computer-assisted surgical system. As shown, configuration 1100 includes an enhanced depth map generator 1104 that receives imagery 1102 of a surgical space. Imagery 1102 may be captured by any suitable imaging device or tool, such as an endoscope, a fluoroscope, or any such device with one or more cameras. In FIG. 11, imagery 1102 is shown as stereoscopic imagery that includes a left image 1102-L and a right image 1102-R.

Enhanced depth map generator 1104 may be configured to use the stereoscopic imagery, object data 1106, and object model data 1108 to generate an enhanced depth map 1110. This may be done in any suitable way by enhanced depth map generator 1104, including by performing one or more of the operations described herein. For example, enhanced depth map generator 1104 may identify an object in a surgical space (e.g., from object data 1106 and/or by detecting a depiction of the object in the stereoscopic imagery), access model data (e.g., object model data 1108) representative of a model of the object, identifying a pose of the object in the surgical space, aligning the model with the pose of the object, and using the model data (e.g., object model data 1108) to generate, based on the alignment of the model with the pose of the object, an enhanced depth map.

In some examples, enhanced depth map generator 1104 may generate an enhanced depth map without generating and/or using an initial depth map of the surgical space. For instance, enhanced depth map generator 1104 may use object data 1106 and object model data 1108 for an aligned model of an identified object to determine depth information for points on the identified object and may use stereoscopic imagery to determine depth information for a remainder of points in the surgical space. Enhanced depth map generator 1104 may composite the depth information provided by the model data with the depth information for the remainder of the points to generate an enhanced depth map 1110 directly without first having to generate or use (e.g., modify) an initial depth map.

While certain examples described above are described with reference to a surgical instrument, this is illustrative and not limiting. Model data for any identifiable object in a surgical space may be similarly used to generate an enhanced depth map as described herein.

Processing system 100 may be configured to determine depth values for points in an enhanced depth map based on model data in any suitable way. As an example, processing system 100 may be configured to select whether to include, in the enhanced depth map, a measured (i.e., sensed) depth value or a modeled depth value for a point in the enhanced depth map. The measured depth value for the point may represent a depth value that is determined based on sensed information for the surgical space, such as based on stereoscopic imagery of the surgical space. The modeled depth value for the point may represent a depth value that is determined based on a model that is aligned with the surgical space. Processing system 100 may select which depth value to include in the enhanced depth map based on any suitable criteria, such as by determining whether the point on the aligned model occludes a corresponding point in the surgical space or vice versa and selecting the depth value for the nearest point (i.e., the occluding point) for inclusion in the enhanced depth map. As another example, processing system 100 may be configured to perform one or more blending operations to blend multiple depth values associated with a point into a single depth value that is inserted in the enhanced depth map.

As mentioned, an enhanced depth map of a surgical space, such as any of the exemplary enhanced depth maps described herein, may be used by a computer-assisted surgical system, such as to provide one or more features to a user of the computer-assisted surgical system. An exemplary computer-assisted surgical system that is configured to use model data to generate an enhanced depth map and to use the enhanced depth map to provide one or more features will now be described. The described computer-assisted surgical system is illustrative only. Other computer-assisted surgical systems may be similarly configured to generate and use an enhanced depth map as described herein.

Figure 12:
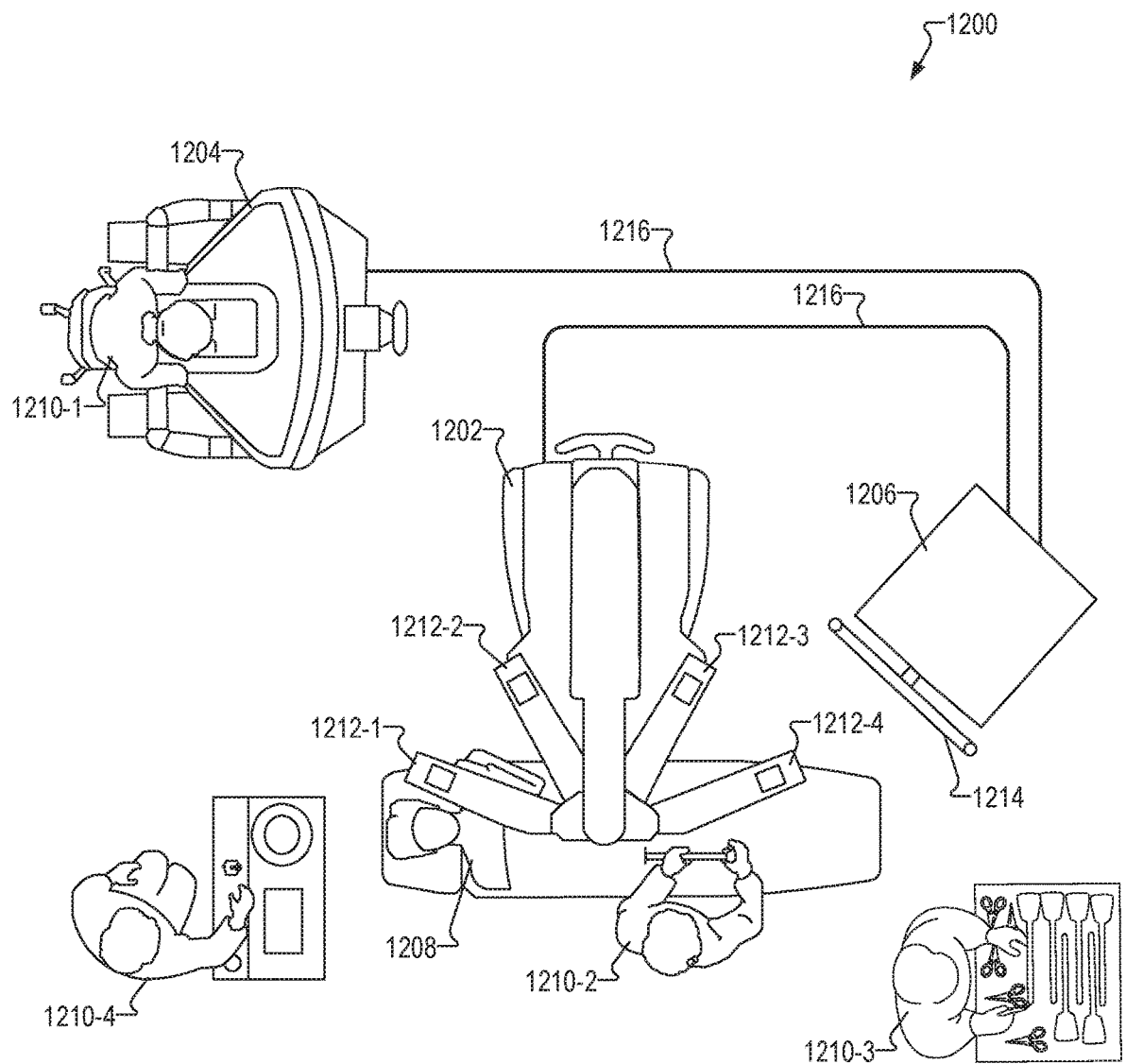
FIG. 12 illustrates an exemplary computer-assisted surgical system according to principles described herein.

FIG. 12 illustrates an exemplary computer-assisted surgical system 1200 ("surgical system 1200"). As shown, surgical system 1200 may include a manipulating system 1202, a user control system 1204, and an auxiliary system 1206 communicatively coupled one to another. Surgical system 1200 may be utilized by a surgical team to perform a computer-assisted surgical procedure on a patient 1208. As shown, the surgical team may include a surgeon 1210-1, an assistant 1210-2, a nurse 1210-3, and an anesthesiologist 1210-4, all of whom may be collectively referred to as "surgical team members 1210." Additional or alternative surgical team members may be present during a surgical session as may serve a particular implementation.

While FIG. 12 illustrates an ongoing minimally invasive surgical procedure, it will be understood that surgical system 1200 may similarly be used to perform open surgical procedures or other types of surgical procedures that may similarly benefit from the accuracy and convenience of surgical system 1200. Additionally, it will be understood that the surgical session throughout which surgical system 1200 may be employed may not only include an operative phase of a surgical procedure, as is illustrated in FIG. 12, but may also include preoperative, postoperative, and/or other suitable phases of the surgical procedure. A surgical procedure may include any procedure in which manual and/or instrumental techniques are used on a patient to investigate or treat a physical condition of the patient.

As shown in FIG. 12, manipulating system 1202 may include a plurality of manipulator arms 1212 (e.g., manipulator arms 1212-1 through 1212-4) to which a plurality of surgical instruments may be coupled. Each surgical instrument may be implemented by any suitable surgical instrument (e.g., a tool having tissue-interaction functions), medical tool, imaging device (e.g., an endoscope), sensing instrument (e.g., a force-sensing surgical instrument), diagnostic instrument, or the like that may be used for a computer-assisted surgical procedure on patient 1208 (e.g., by being at least partially inserted into patient 1208 and manipulated to perform a computer-assisted surgical procedure on patient 1208). While manipulating system 1202 is depicted and described herein as including four manipulator arms 1212, it will be recognized that manipulating system 1202 may include only a single manipulator arm 1212 or any other number of manipulator arms as may serve a particular implementation.

Manipulator arms 1212 and/or surgical instruments attached to manipulator arms 1212 may include one or more displacement transducers, orientational sensors, and/or positional sensors used to generate raw (i.e., uncorrected) kinematics information. One or more components of surgical system 1200 may be configured to use the kinematics information to track (e.g., determine positions of) and/or control the surgical instruments.

User control system 1204 may be configured to facilitate control by surgeon 1210-1 of manipulator arms 1212 and surgical instruments attached to manipulator arms 1212. For example, surgeon 1210-1 may interact with user control system 1204 to remotely move or telemanipulate manipulator arms 1212 and the surgical instruments. To this end, user control system 1204 may provide surgeon 1210-1 with imagery (e.g., high-definition 3D imagery) of a surgical space associated with patient 1208 as captured by an imaging system (e.g., an endoscope or any other suitable medical imaging system). In certain examples, user control system 1204 may include a stereo viewer having two displays where stereoscopic images of a surgical space associated with patient 1208 and generated by a stereoscopic imaging system may be viewed by surgeon 1210-1. Surgeon 1210-1 may utilize the imagery to perform one or more procedures with one or more surgical instruments attached to manipulator arms 1212.

To facilitate control of surgical instruments, user control system 1204 may include a control mechanism such as a set of master controls. The master controls may be manipulated by surgeon 1210-1 to control movement of surgical instruments (e.g., by utilizing robotic and/or teleoperation technology). The master controls may be configured to detect a wide variety of hand, wrist, and finger movements by surgeon 1210-1. In this manner, surgeon 1210-1 may intuitively perform a procedure using one or more surgical instruments.

Auxiliary system 1206 may include one or more computing devices configured to perform primary processing operations of surgical system 1200. In such configurations, the one or more computing devices included in auxiliary system 1206 may control and/or coordinate operations performed by various other components (e.g., manipulating system 1202 and user control system 1204) of surgical system 1200. For example, a computing device included in user control system 1204 may transmit instructions to manipulating system 1202 by way of the one or more computing devices included in auxiliary system 1206. As another example, auxiliary system 1206 may receive, from manipulating system 1202, and process image data representative of imagery captured by an imaging device attached to one of manipulator arms 1212.

In some examples, auxiliary system 1206 may be configured to present visual content to surgical team members 1210 who may not have access to the images provided to surgeon 1210-1 at user control system 1204. To this end, auxiliary system 1206 may include a display monitor 1214 configured to display one or more user interfaces, such as imagery of the surgical area, information associated with patient 1208 and/or the surgical procedure, and/or any other visual content as may serve a particular implementation. For example, display monitor 1214 may display images of the surgical area together with additional content (e.g., graphical content, contextual information, etc.) concurrently displayed with the images. In some embodiments, display monitor 1214 is implemented by a touchscreen display with which surgical team members 1210 may interact (e.g., by way of touch gestures) to provide user input to surgical system 1200.

Manipulating system 1202, user control system 1204, and auxiliary system 1206 may be communicatively coupled one to another in any suitable manner. For example, as shown in FIG. 12, manipulating system 1202, user control system 1204, and auxiliary system 1206 may be communicatively coupled by way of control lines 1216, which may represent any wired or wireless communication link as may serve a particular implementation. To this end, manipulating system 1202, user control system 1204, and auxiliary system 1206 may each include one or more wired or wireless communication interfaces, such as one or more local area network interfaces, Wi-Fi network interfaces, cellular interfaces, etc.

Processing system 100 may be implemented by one or more components of surgical system 1200 such that surgical system 1200 is configured to use model data to generate enhanced depth maps of a surgical space and to use the enhanced depth maps to provide one or more features of the surgical system 1200. For example, surgical system 1200 may be configured to use an enhanced depth map to generate augmented imagery of a surgical space and to present the augmented imagery to one or more users of the surgical system 1200.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media. Such a non-transitory computer-readable medium storing computer-readable instructions may be implemented by one or more components of surgical system 1200.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 13:
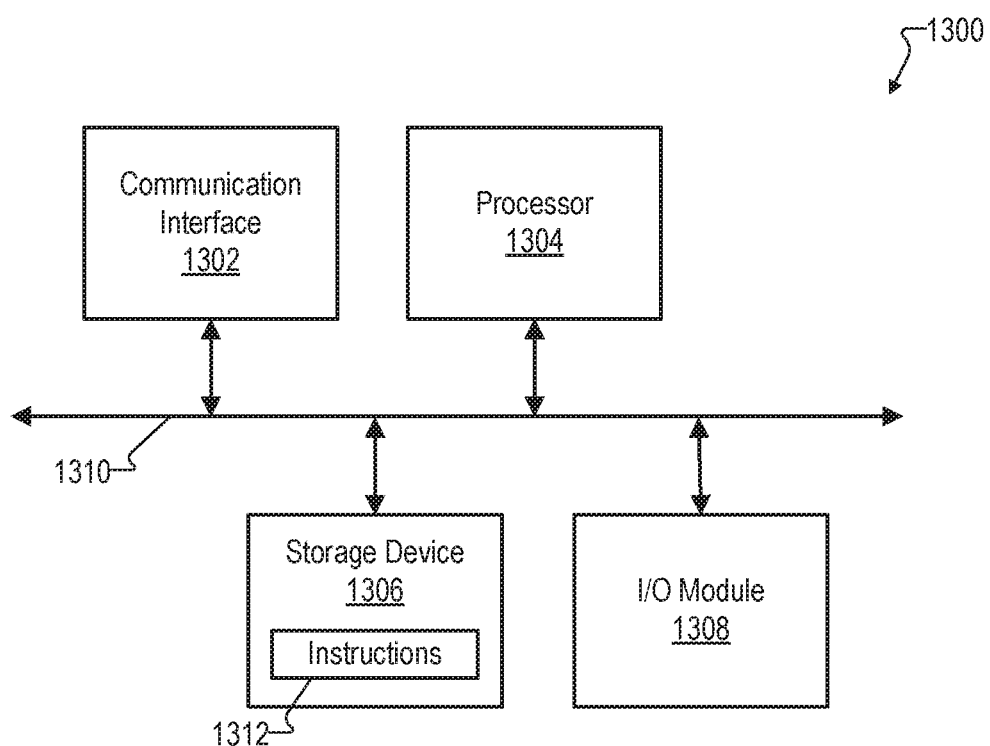
FIG. 13 illustrates an exemplary computing system according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with instructions 1312 computer-executable instructions 1312 (e.g., one or more applications) such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of executable instructions 1312 configured to direct processor 1304 to perform any of the operations described herein may be stored within storage device 1306. In some examples, data may be arranged in one or more databases residing within storage device 1306. In certain implementations, instructions 1312 may include instructions 106 of processing system 100, processor 1304 may include or implement processing facility 104, and storage device 1306 may include or implement storage facility 102.

I/O module 1308 may include one or more I/O modules configured to receive user input and provide user output. One or more I/O modules may be used to receive input for a single virtual reality experience. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
   a memory storing instructions;
   a processor communicatively coupled to the memory and configured to execute the instructions to:
      identify an object in a surgical space;
      access an initial depth map of the surgical space, the initial depth map of the surgical space including missing depth data;
      access a computer-assisted design (CAD) model of the object;
      identify a pose of the object in the surgical space;
      align the CAD model with the pose of the object to define depth data for the CAD model in the surgical space;
      generate a depth map for at least a portion of the object in the surgical space based on the initial depth map of the surgical space and the depth data for the CAD model; and
      generate, using the depth map, an augmented image of the surgical space.

2. The system of claim 1, wherein:
   the initial depth map includes depth information based on depth sensing of the surgical space; and
   the generating the depth map includes modifying, based on the depth data of the CAD model, the initial depth map to generate the depth map.

3. The system of claim 2, wherein the depth sensing of the surgical space comprises determining the depth information based on stereoscopic imagery of the surgical space.

4. The system of claim 2, wherein the generating of the depth map comprises:
   comparing, for a point in the surgical space, the depth information that is based on the depth sensing of the surgical space with the depth data for the CAD model;
   determining, based on the comparing, an occlusion between the depth information and the depth data for the point in the surgical space; and
   selecting, based on the determined occlusion, a depth value for the point in the surgical space for use in generating the depth map.

5. The system of claim 1, wherein:
   the object is a surgical instrument; and the CAD model includes a three-dimensional (3D) CAD model of the surgical instrument.

6. The system of claim 1, wherein the generating of the augmented image of the surgical space comprises inserting, using the depth map, a graphical element into a camera-captured image of the surgical space to generate the augmented image of the surgical space.

7. The system of claim 1, wherein the identifying of the pose of the object in the surgical space comprises accessing kinematic information representative of a position and an orientation of the object in the surgical space.

8. The system of claim 1, wherein:
the identifying the pose of the object in the surgical space comprises identifying a deformation of the object; and
the aligning of the CAD model with the pose of the object comprises altering the CAD model based on the deformation of the object.

9. A method comprising:
identifying, by a processor, an object in a surgical space;
accessing an initial depth map of the surgical space, the initial depth map of the surgical space including missing depth data;
accessing, by the processor, a computer-assisted design (CAD) model of the object;
identifying, by the processor, a pose of the object in the surgical space;
aligning, by the processor, the CAD model with the pose of the object to define depth data for the CAD model in the surgical space; and
generating a depth map for at least a portion of the object in the surgical space based on the initial depth map of the surgical space and the depth data for the CAD model; and
generating, using the depth map, an augmented image of the surgical space.

10. The method of claim 9, wherein:
the initial depth map includes depth information based on depth sensing of the surgical space; and
the generating the depth map includes modifying, based on the depth data of the CAD model, the initial depth map to generate the depth map.

11. The method of claim 10, wherein the depth sensing of the surgical space comprises determining the depth information based on stereoscopic imagery of the surgical space.

12. The method of claim 9, wherein the generating of the augmented image of the surgical space comprises inserting, using the depth map, a graphical element into a camera-captured image of the surgical space to generate the augmented image of the surgical space.

13. The method of claim 9, wherein the depth map further includes interpolated depth information for points in the surgical space that are outside of the object, the interpolated depth information interpolated based on the additional points being outside of the aligned CAD model and having missing depth values.

14. The method of claim 9, wherein the identifying of the pose of the object in the surgical space comprises accessing kinematic information representative of a position and an orientation of the object in the surgical space.

15. A non-transitory computer-readable medium storing instructions that, when executed, direct at least one processor of a computing device to:
identify an object in a surgical space;
access an initial depth map of the surgical space, the initial depth map of the surgical space including missing depth data;
access a computer-assisted design (CAD) model of the object;
identify a pose of the object in the surgical space;
align the CAD model with the pose of the object to define depth data for the CAD model in the surgical space; and
generate a depth map for at least a portion of the object in the surgical space based on the initial depth map of the surgical space and the depth data for the CAD model; and
generate, using the depth map, an augmented image of the surgical space.

16. The computer-readable medium of claim 15, wherein:
the initial depth map includes depth information based on depth sensing of the surgical space; and
the generating the depth map includes modifying, based on the depth data of the CAD model, the initial depth map to generate the depth map.

* * * * *

UNITED STATES PATENT AND TRADEMARK OFFICE
CERTIFICATE OF CORRECTION

| | | |
|---|---|---|
| PATENT NO. | : 12,450,760 B2 | Page 1 of 1 |
| APPLICATION NO. | : 17/600061 | |
| DATED | : October 21, 2025 | |
| INVENTOR(S) | : Heath Feather et al. | |

It is certified that error appears in the above-identified patent and that said Letters Patent is hereby corrected as shown below:

In the Claims

Column 22, Claim 13, Line 12, delete "additional".

Signed and Sealed this
Second Day of December, 2025

John A. Squires
*Director of the United States Patent and Trademark Office*